(12) United States Patent
Huang et al.

(10) Patent No.: US 12,707,147 B2
(45) Date of Patent: Aug. 11, 2026

(54) PICTURE RETAKING METHOD AND APPARATUS, MOVABLE PLATFORM, SYSTEM, AND STORAGE MEDIUM

(71) Applicant: SZ DJI TECHNOLOGY CO., LTD., Shenzhen (CN)

(72) Inventors: Zhenhao Huang, Shenzhen (CN); Zhaohui Fang, Shenzhen (CN); Gang He, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 251 days.

(21) Appl. No.: 18/407,645

(22) Filed: Jan. 9, 2024

(65) Prior Publication Data

US 2024/0147068 A1 May 2, 2024

Related U.S. Application Data

(63) Continuation of application No. PCT/CN2021/106597, filed on Jul. 15, 2021.

(51) Int. Cl.
*H04N 23/68* (2023.01)
*B64U 20/83* (2023.01)
(Continued)

(52) U.S. Cl.
CPC ......... *H04N 23/6812* (2023.01); *B64U 20/83* (2023.01); *B64U 20/87* (2023.01);
(Continued)

(58) Field of Classification Search
CPC G01C 11/04; B64U 2201/10; B64U 2101/30; B64U 20/87; B64U 20/83;
(Continued)

(56) References Cited

U.S. PATENT DOCUMENTS

2009/0041295 A1 2/2009 Matsuzaka et al.
2018/0088581 A1* 3/2018 Freeman ............. G03B 15/006

FOREIGN PATENT DOCUMENTS

CN 110345925 A 10/2019
CN 111247789 A 6/2020
(Continued)

OTHER PUBLICATIONS

The World Intellectual Property Organization (WIPO) International Search Report for PCT/CN2021/106597 Apr. 13, 2022 5 pages (Including English translation).

*Primary Examiner* — Xi Wang
(74) *Attorney, Agent, or Firm* — Anova Law Group, PLLC

(57) ABSTRACT

A control system includes one or more processors and one or more memories. The one or more memories store one or more computer programs that, when executed by the one or more processors, cause the one or more processors to obtain operation information of a movable platform performing an operation in a target area, determine at least one operation abnormal area of the movable platform performing the operation in the target area according to the operation information, determine a corresponding supplement operation path according to the at least one operation abnormal area, and control the movable flatform to perform a supplement operation based on the supplement operation path.

18 Claims, 16 Drawing Sheets

(51) Int. Cl.
*B64U 20/87* (2023.01)
*B64U 101/30* (2023.01)
*H04N 23/57* (2023.01)
*H04N 23/617* (2023.01)
*H04N 23/63* (2023.01)
*H04N 23/695* (2023.01)

(52) U.S. Cl.
CPC ........... *H04N 23/57* (2023.01); *H04N 23/617* (2023.01); *H04N 23/633* (2023.01); *H04N 23/695* (2023.01); *B64U 2101/30* (2023.01)

(58) Field of Classification Search
CPC .. H04N 23/661; H04N 23/695; H04N 23/633; H04N 23/617; H04N 23/57; H04N 23/6812; G03B 15/02; G03B 15/006; G03B 17/561
See application file for complete search history.

(56) References Cited

FOREIGN PATENT DOCUMENTS

| | | | |
|---|---|---|---|
| CN | 111899331 | A | 11/2020 |
| CN | 112362068 | A | 2/2021 |
| CN | 112399084 | A | 2/2021 |
| CN | 115797612 | A | 3/2023 |
| JP | 2020183873 | A | 11/2020 |

* cited by examiner

Figure 7:
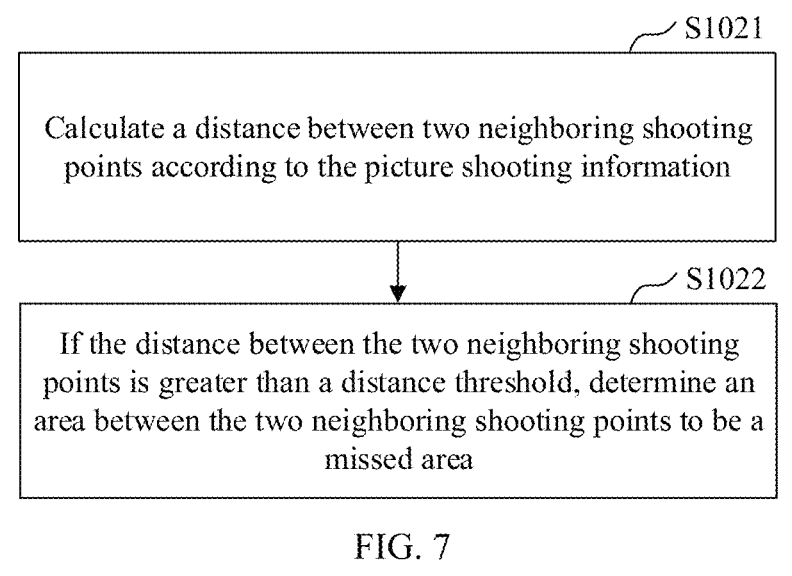

S1021

Calculate a distance between two neighboring shooting points according to the picture shooting information

S1022

If the distance between the two neighboring shooting points is greater than a distance threshold, determine an area between the two neighboring shooting points to be a missed area

If a plurality of missed areas are included, determine an execution sequence of the plurality of missed areas

S1034

According to the plurality of missed areas and the execution sequence of the plurality of missed areas, determine the retaking path

PICTURE RETAKING METHOD AND APPARATUS, MOVABLE PLATFORM, SYSTEM, AND STORAGE MEDIUM

CROSS-REFERENCE TO RELATED APPLICATION

This application is a continuation of International Application No. PCT/CN2021/106597, filed Jul. 15, 2021, the entire content of which is incorporated herein by reference.

TECHNICAL FIELD

The present disclosure relates to the movable platform technology and, more particularly, to a picture retaking method, a picture retaking apparatus, a movable platform, a system, and a storage medium.

BACKGROUND

A movable platform such as an unmanned aerial vehicle (UAV) photographs according to a certain sequence/distance when performing a survey operation. Due to apparatus failure or other factors, the movable platform misses shooting. Thus, a retaking operation needs to be performed. Currently, the missing position is determined manually, which involves a large amount of work, and the accuracy of the missing position identification is low. Moreover, for the missing positions, a flight path is planned manually to perform retaking, or the retaking is performed manually, which is time and labor consuming. Moreover, it is hard to ensure the retaken picture is effective and reliable.

Therefore, the convenience and reliability of the picture retaking need to be improved.

SUMMARY

In accordance with the disclosure, there is provided a control system, including one or more processors and one or more memories. The one or more memories store one or more computer programs that, when executed by the one or more processors, cause the one or more processors to obtain operation information of a movable platform performing an operation in a target area, determine at least one operation abnormal area of the movable platform performing the operation in the target area according to the operation information, determine a corresponding supplement operation path according to the at least one operation abnormal area, and control the movable platform to perform a supplement operation based on the supplement operation path.

Also in accordance with the disclosure, there is provided a control method. The method includes obtaining operation information of a movable platform performing an operation in a target area, determining at least one operation abnormal area of the movable platform performing the operation in the target area according to the operation information, determining a corresponding supplement operation path according to the at least one operation abnormal area, and controlling the movable platform to perform a supplement operation based on the supplement operation path.

BRIEF DESCRIPTION OF THE DRAWINGS

FIG. 7 is a schematic flowchart of determining at least one missed area of a movable platform in a survey area according to picture shooting information consistent with an embodiment of the present disclosure.

DETAILED DESCRIPTION OF THE EMBODIMENTS

The technical solution of embodiments of the present disclosure is described in detail in connection with the accompanying drawings. Described embodiments are some embodiments of the present disclosure, not all embodiments. Based on embodiments of the present disclosure, all other embodiments obtained by those of ordinary skill in the art without creative efforts are within the scope of the present disclosure.

The flowchart in the accompanying drawings is illustrative, does not necessarily include all contents and operations/processes, and is not necessarily executed according to a described sequence. For example, some operations/processes can be divided, grouped, or partially combined. Thus, the actual execution sequence can be changed as needed.

The terminology used in the present disclosure is merely for the purpose of describing specific embodiments only and is not intended to limit the present disclosure. The singular forms "a," "an," and "the" are intended to include the plural forms unless the context indicates otherwise. The term "and/or" refers to any one or more of the listed items and all possible combinations thereof.

The term "and/or" used in the specification and appended claims refers to one or more combinations and all combinations of associated items and includes these combinations.

Embodiments of the present disclosure are described in detail in connection with the accompanying drawings. When there is no conflict, embodiments and features of embodiments can be grouped with each other.

Figures 1, 2:
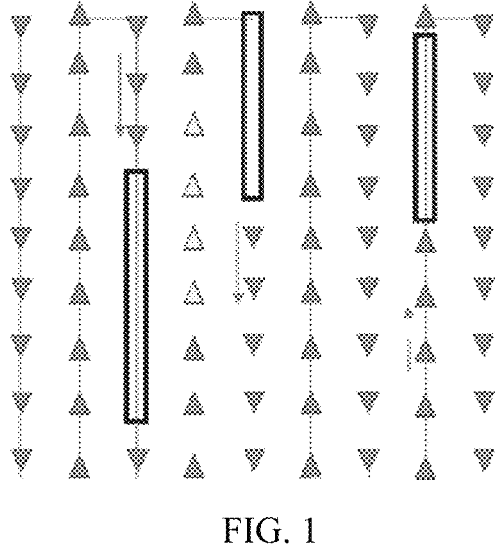
FIG. 1 is a schematic diagram of a corresponding shooting point when a survey area operation is single-direction shooting consistent with an embodiment of the present disclosure.
FIG. 2 is a schematic diagram of a corresponding shooting point when a survey area operation is multi-directional shooting consistent with an embodiment of the present disclosure.

A movable platform, such as an unmanned aerial vehicle (UAV), can photograph according to a certain sequence/distance during a survey operation. Due to an apparatus failure or other factors, operation abnormality, such as missing shooting, can occur. An area in which operation abnormality occurs is also referred to as an operation abnormal area. For example, FIG. 1 is a schematic diagram showing corresponding shooting points when a survey area operation is single-direction shooting consistent with an embodiment of the present disclosure. A blank area in the figure is an operation abnormal area. In the example shown in FIG. 1, shooting is not performed normally in the blank area (operation abnormal area) due to apparatus failure or other factors. For example, the shooting can be missed. The area where the shooting is missed can also be referred to as a missed area.

In some other embodiments, the operation abnormality in an operation abnormal area can include abnormal operation of a payload of the movable platform. The payload can include a spray device, a spreading device, or a position/attitude sensor, etc. An abnormal operation can include abnormal spraying, abnormal spreading, abnormal positioning, or abnormal attitude detection. When the payload is the camera device, the abnormal operation can include poor shooting quality, such as overexposure, or insufficient shooting clarity.

FIG. 2 is a schematic diagram of a corresponding shooting point when a survey area operation is multi-directional shooting consistent with an embodiment of the present disclosure.

Therefore, a retaking operation needs to be performed. Currently, a missing position is usually determined manually, which is labor-intensive. The accuracy of recognizing the missing position may not be high. For missing positions, the retaking can be performed by manually planning a path, or the retaking can be performed manually, which is labor and time consuming. Moreover, the picture cannot be retaken effectively and reliably.

To address the above issues, embodiments of the present disclosure provide a picture retaking method, a picture retaking apparatus, a movable platform, a system, and a storage medium, which are configured to improve the convenience and reliability of picture retaking.

Figure 3:
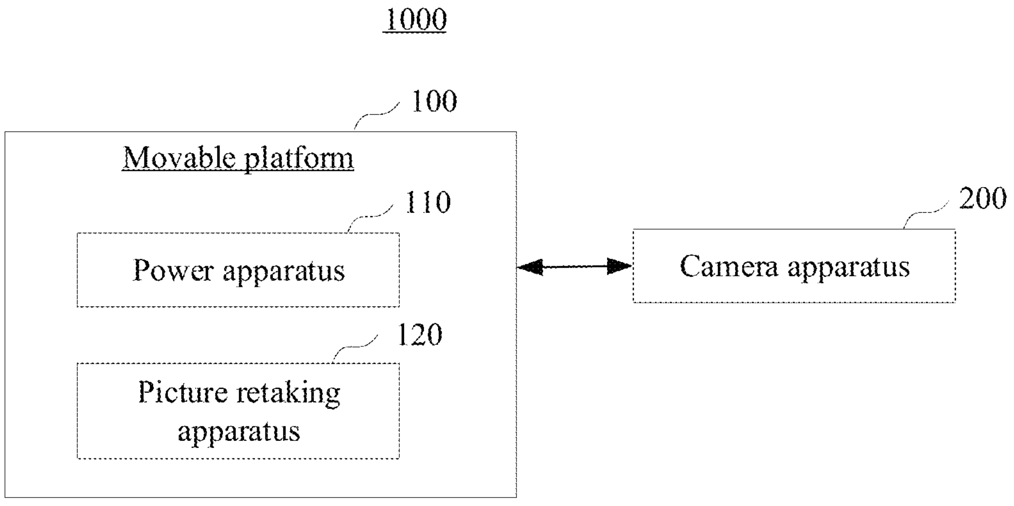
FIG. 3 is a schematic structural diagram of a movable platform system consistent with an embodiment of the present disclosure.

FIG. 3 is a schematic structural diagram of a movable platform system consistent with an embodiment of the present disclosure. As shown in FIG. 3, the movable platform system 1000 includes a movable platform 100 and a camera apparatus 200. If the movable platform 100 misses shooting while performing the operation in the survey area, a corresponding retaking path is determined through the movable platform 100. Based on the retaking path, the camera apparatus 200 can be controlled to perform the picture retaking operation to obtain a retaken picture.

The movable platform 100 can include, but is not limited to, an unmanned aerial vehicle (UAV), such as a rotary-wing aerial vehicle, including a single-rotor aerial vehicle, dual-rotor aerial vehicle, tri-rotor aerial vehicle, quad-rotor aerial vehicle, hexa-rotor aerial vehicle, octa-rotor aerial vehicle, deci-rotor aerial vehicle, dodeca-rotor aerial vehicle, etc. The movable platform 100 can also include other types of UAVs or movable apparatuses, such as fixed-wing UAVs, which are not limited in the present disclosure.

The camera apparatus 200 can include, but is not limited to, a camera, a camcorder, etc. The camera apparatus 200 can also include other types of apparatuses having a shooting function, such as a visual sensor, which is not limited in the present disclosure.

For example, the movable platform 100 includes a power apparatus 110 and a picture retaking apparatus 120. The power apparatus 110 can be configured to provide power to the movable platform 100. The picture retaking apparatus 120 can include, but is not limited to, a flight controller, and can be configured to generate a corresponding retaking path corresponding to the operation of the movable platform 100 in the survey area and control the camera apparatus 200 to perform picture retaking based on the retaking path to improve the convenience and reliability of picture retaking.

In some embodiments, the power apparatus 110 can include one or more electronic speed controllers (referred to as ESCs), one or more propellers, and one or more motors corresponding to the one or more propellers. A motor can be connected between an ESC and a propeller. The ESC can be configured to provide drive current to the motor to control a rotation speed of the motor. The motor can be configured to drive the propeller to rotate to provide the power for the flight of the movable platform 100. This power can enable the movable platform 100 to move in one or more degrees of freedom. In some embodiments, the movable platform 100 can rotate around one or more axes. The motor can be a direct current (DC) motor or an alternating current (AC) motor. Furthermore, the motor can be a brushless motor or a brushed motor.

Figure 4:
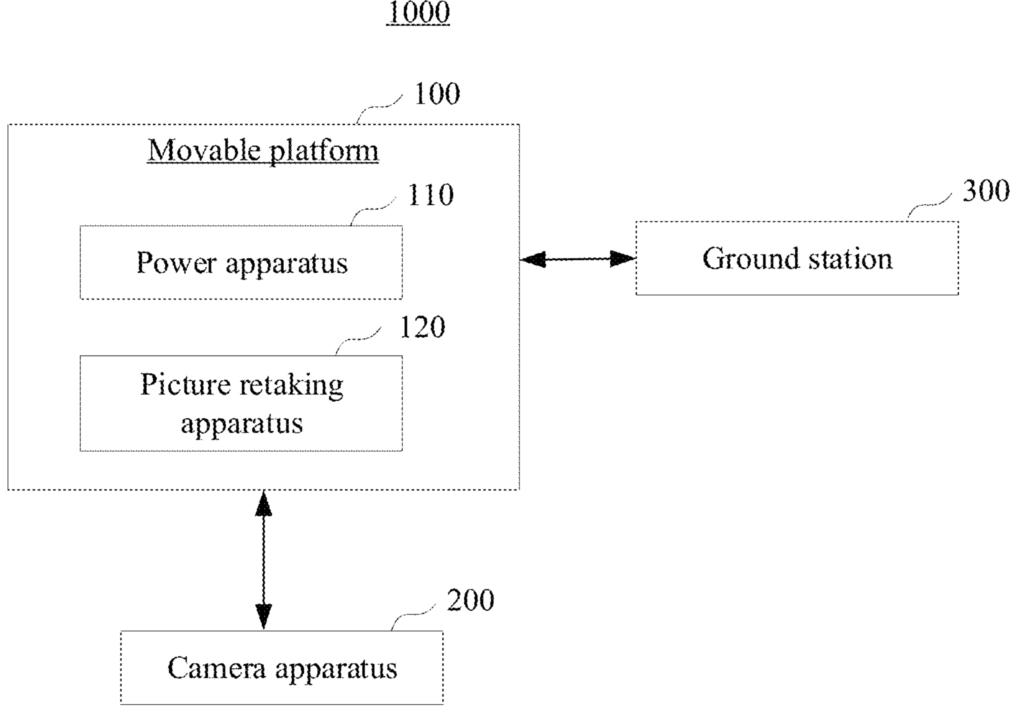
FIG. 4 is a schematic structural diagram of another movable platform system consistent with an embodiment of the present disclosure.

In some embodiments, as shown in FIG. 4, the movable platform system 1000 further includes a ground station 300. The ground station 300 establishes wireless communication with the movable platform 100. Through interactions among the ground station 300, the movable platform 100, and the camera apparatus 200, a survey area operation and a corresponding retaking operation can be implemented.

Figure 5:
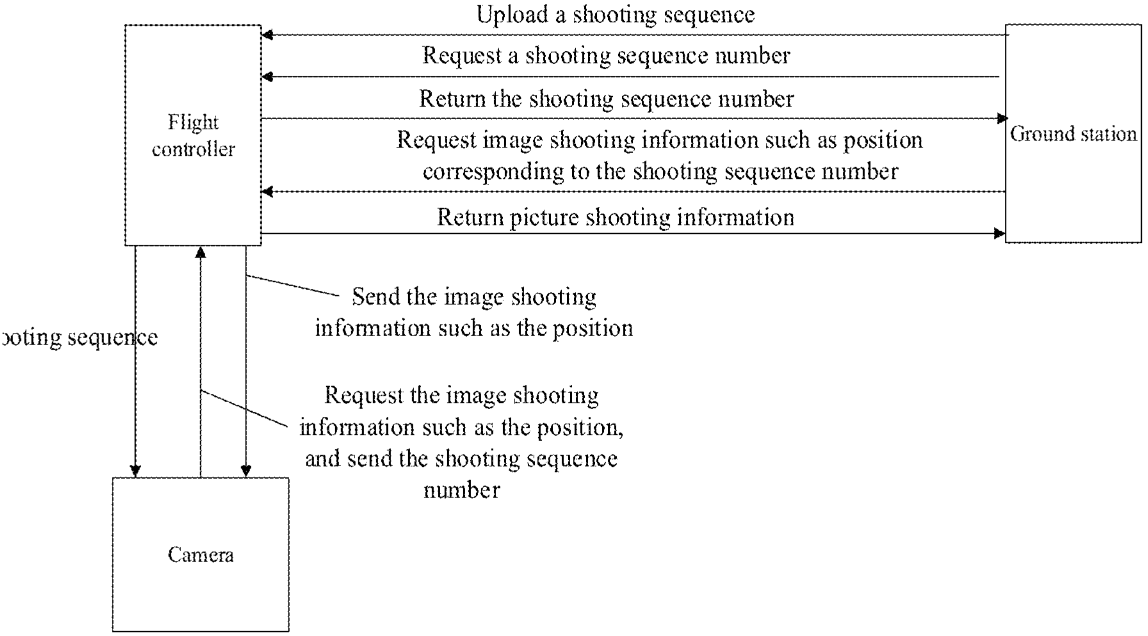
FIG. 5 is a schematic diagram showing a survey area operation of obtaining picture shooting information consistent with an embodiment of the present disclosure.

For example, the movable platform 100 can be a UAV, the picture retaking apparatus 120 can be a flight controller of the UAV, and the camera apparatus 200 can be a camera. As shown in FIG. 5, during the operation, the ground station uploads information about a planned operation flight path, shooting positions, a shooting sequence, etc., to the flight controller. Then, the flight controller sends the shooting sequence to the camera. When the camera performs shooting, the camera returns a shooting sequence number to the flight controller and requests for picture shooting information about a position, an attitude, a positioning status, etc. The flight controller records the picture shooting information about the corresponding shooting sequence number, the position, the attitude, the positioning status, etc., in a flight system. Then, the flight controller sends the picture-shooting information to the camera, and the camera writes the picture-shooting information into a picture corresponding to the shooting.

Then, the ground station can request the shooting sequence number from the flight controller. After receiving the request, the flight controller returns the shooting sequence number and confirms that communication is normal. The ground station can again request the picture shooting information about the position, the attitude, the positioning status, etc., corresponding to the shooting sequence number. The flight controller returns the picture shooting information. Then, the ground station can access to the picture shooting information about the shooting sequence number, the position, the attitude, the positioning status, etc.

If the UAV misses shooting during the survey area operation, the flight controller can obtain the picture shooting information, automatically generate a corresponding retaking path according to the picture shooting information, and control the camera to perform a picture retaking operation based on the retaking path.

Names of the various components in the movable platform system 1000 are merely for identification purposes and do not limit embodiments of the present disclosure.

The picture retaking method of embodiments of the present disclosure is described in detail based on the movable platform system 1000 and the movable platform 100 below. The movable platform system 1000 and the movable platform 100 in FIG. 1 and FIG. 2 are merely used to describe the picture retaking method of embodiments of the present disclosure and do not limit an application scene of the picture retaking method of embodiments of the present disclosure.

Figure 6:
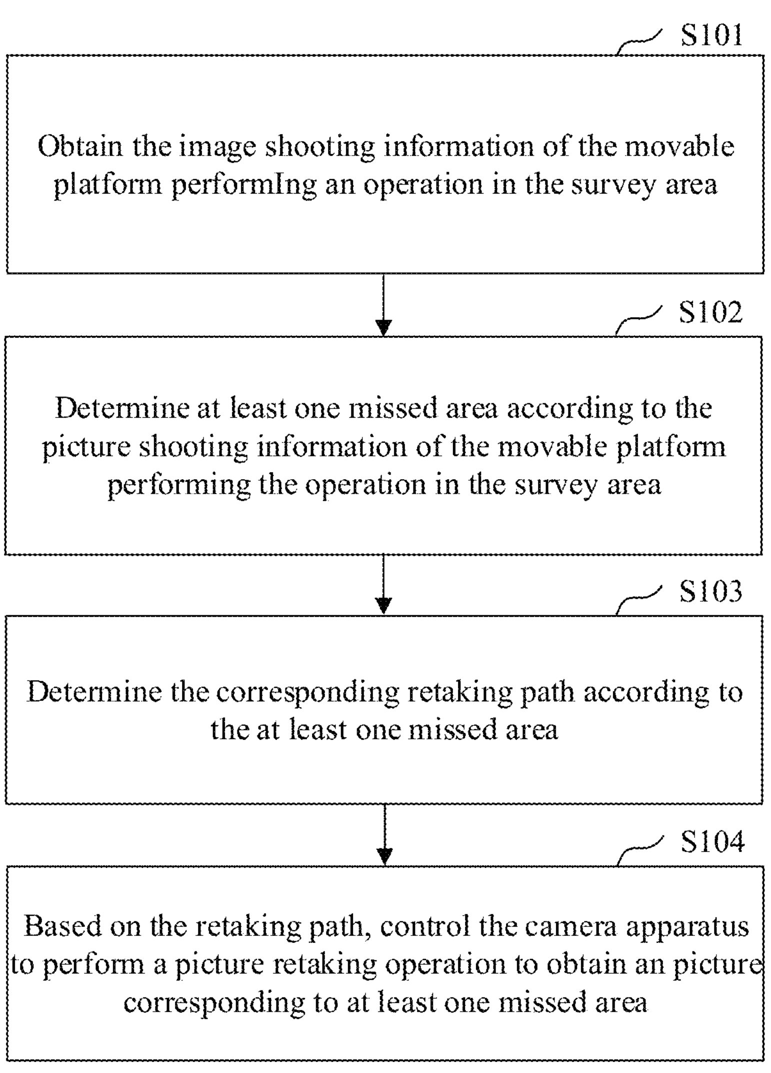
FIG. 6 is a schematic flowchart of a picture retaking method consistent with an embodiment of the present disclosure.

FIG. 6 is a schematic flowchart of a picture retaking method consistent with an embodiment of the present disclosure. The method can be applied in the movable platform above or another apparatus including a picture retaking apparatus. The application scene of the method is not limited in the present disclosure. The convenience and the reliability of the picture retaking can be improved based on the picture retaking method. The picture retaking method is described in detail by applying the picture retaking method to the movable platform.

As shown in FIG. 6, the picture retaking method includes processes S101 to S104.

At S101, the picture shooting information when the movable platform performs the survey area operation is obtained.

The picture shooting information can include at least one of a picture shooting sequence number, a position, an attitude, or a location status. The attitude can include but is not limited to a pitch attitude, a roll attitude, and a yaw attitude. The positioning status can include but is not limited to a Real-Time Kinematic (RTK) status.

In some embodiments, the movable platform can obtain the corresponding picture shooting information in real-time while performing operation in the survey area. In some other embodiments, the movable platform can obtain the picture shooting information corresponding to the operation after completing the operation in the survey area.

In some embodiments, the picture shooting information can also be obtained by the ground station or the camera apparatus. For example, when the movable platform performs the operation in the survey area, the ground station can communicate with the movable platform and the camera apparatus in real-time. First, the ground station can upload information about the planned operation flight path, the shooting positions, the shooting sequence, etc., to the movable platform. Then, the movable platform can send the shooting sequence to the camera apparatus such as the camera. When the camera apparatus performs shooting, the camera apparatus can return the shooting sequence number to the movable platform and request the picture shooting information about the position, the attitude, and the positioning status. The movable platform can record the picture shooting information about the shooting sequence number, the position, the attitude, and the positioning status in the flight system and then send the picture-shooting information to the camera apparatus. The camera apparatus can write the picture-shooting information into the picture corresponding to the shooting.

Then, the ground station can request the shooting sequence number from the movable platform. The movable platform can receive the request, then return the shooting sequence number, and confirm that the communication is normal. The ground station can then send another request to the movable platform for the picture shooting information about the position, the attitude, and the positioning status corresponding to the shooting sequence number. The movable platform can return the picture shooting information. Then, the ground station can obtain the picture shooting information about the shooting sequence number, the position, the attitude, and the positioning status.

In some embodiments, a list can be maintained in the ground station during a mission. The list can include picture shooting information about shooting sequence numbers, positions, attitudes, and positioning statuses for the most recent shooting points.

In some embodiments, for a certain operation performed by the movable platform in a survey area, a corresponding folder can be generated in the camera apparatus. The folder can include a text file storing the picture shooting information about the shooting sequence number, the position, the attitude, and the positioning status corresponding to the operation. After the operation, the ground station can access the file to obtain the picture shooting information.

At S102, at least one missed area is determined according to the picture shooting information when the movable platform performs the operation in the survey area.

During actual operation, shooting can be missed, and shooting can be even missed at one or more positions. To perform picture retaking, one or more missed areas can be determined according to the picture shooting information when the movable platform performs the operation in the survey area. Compared to manually determining the missed areas, the missed areas can be identified with higher accuracy.

In some embodiments, the movable platform can determine at least one corresponding missed area according to the picture shooting information corresponding to the shooting points where shooting has been performed in real-time during the operation in the survey area. That is, during the operation, the missed area can be determined in real-time once the shooting is missed.

In some other embodiments, after the operation in the survey area, the movable platform can determine the at least one missed area according to the picture shooting information corresponding to all shooting points of the operation in the survey area. That is, during the operation, the missing of the shooting may not be considered. After the operation, all missed areas corresponding to the operation can be determined.

In some embodiments, as shown in FIG. 7, process S102 includes sub-processes S1021 and S1022.

At S1021, a distance between two neighboring shooting points is calculated according to the picture shooting information.

Figure 8:
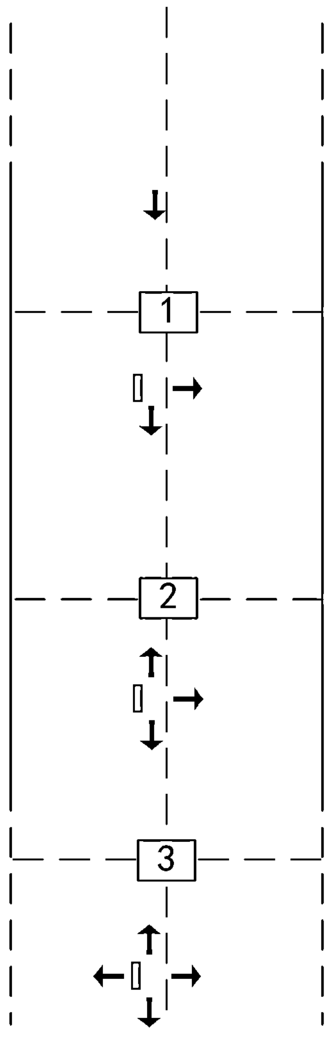
FIG. 8 is a schematic diagram of a shooting sequence corresponding to an operation consistent with an embodiment of the present disclosure.

In some embodiments, during mission planning, the operation can be set to correspond to a specific shooting sequence in different flight segments. The flight segments can be separated by points with specific positions. Each shooting sequence can be a single-direction shooting sequence or a multi-direction shooting sequence. For example, as shown in FIG. 8, different flight segments correspond to different shooting sequences. The boundaries of the flight segments are separation points of the shooting sequences. During mission planning, separation points of different shooting sequences of the flight segments can be recorded. For example, FIG. 8 shows point 1, point 2, and point 3 marked with squares. Point 1 is a separation point for a single-direction shooting sequence and a three-direction shooting sequence. Point 2 is a separation point for the three-direction shooting sequence and a four-direction shooting sequence. The symbols "↑" indicates that a shooting direction is "front," "↓" indicates that the shooting direction is "rear,"←"—" indicates that the shooting direction is "left," "→" indicates that the shooting direction is "right," and "X" indicates that the shooting direction is "orthogonal."

If the survey area operation is single-direction shooting, the distance between two neighboring shooting points can be directly calculated according to the picture shooting information corresponding to the shooting point, such as the position corresponding to the shooting point. To facilitate distinguishing, the distance between the two neighboring shooting points in the single direction shooting can be referred to as a first distance.

If the survey area operation is multi-directional shooting, a same shooting sequence can include a plurality of directions. A distance between two neighboring shooting points with the same direction of neighboring shooting sequences can be calculated, and a distance between two neighboring shooting points with different directions within the same shooting sequence can be calculated according to the picture shooting information corresponding to the shooting points. To facilitate distinguishing and description, the distance between the two neighboring points with the same direction of the two neighboring shooting sequences can be referred to as a second distance. The distance between the two neighboring shooting points with different directions within the same shooting sequence can be referred to as a third distance.

At S1022, if the distance between the two neighboring shooting points is greater than a distance threshold, an area between the two neighboring shooting points is determined to be a missed area.

In a normal shooting condition, distances between every two neighboring shooting points can be similar, e.g., around a certain distance threshold. If the distance between two neighboring shooting points is greater than the distance threshold, the area between the two neighboring shooting points can be determined to be the missed area. Thus, the shooting is missed.

The distance threshold can be a predetermined distance value or can be determined according to the scene where the movable platform performs the operation.

Figure 9:
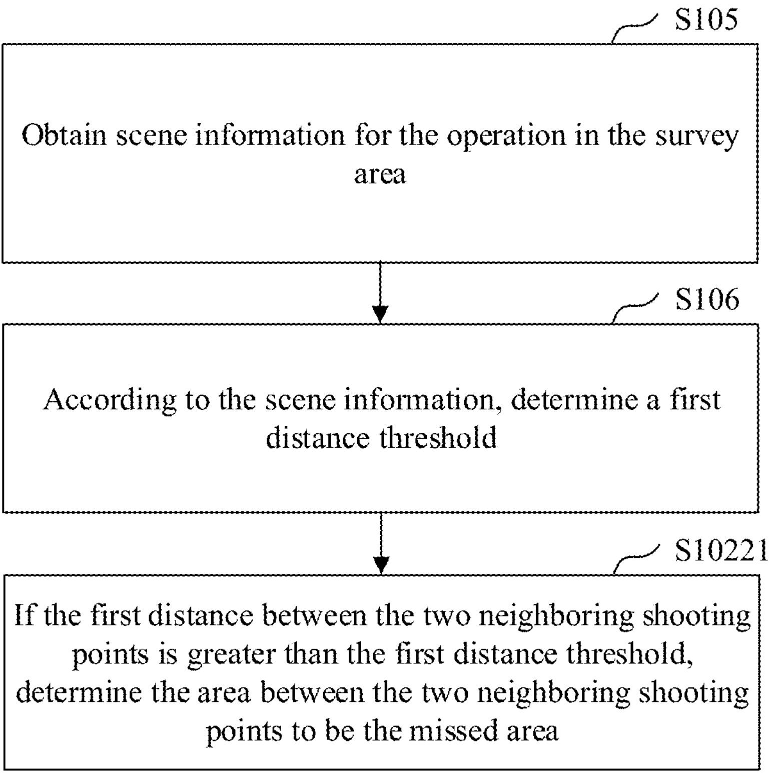
FIG. 9 is a schematic flowchart of determining a missed area consistent with an embodiment of the present disclosure.

In some embodiments, as shown in FIG. 9, processes S105 and S106 are included before process S1022. Process S1022 further includes a sub-process S10221.

At S105, scene information is obtained for the operation in the survey area.

This scene information can include one or more of flight height (H), heading overlapping rate (P), or shooting field of view FOV. During the operation performed in the survey area, the movable platform can obtain the scene information of flight height H, heading overlapping rate P, and shooting field of view FOV corresponding to the operation.

At S106, according to the scene information, a first distance threshold is determined.

First distance threshold D1 can represent a theoretical distance between shooting points in the single-direction operation. First distance threshold D1 can be determined according to the scene information corresponding to the operation in the survey area.

In some embodiments, a predetermined distance formula corresponding to the first distance threshold can be predetermined. One or more of flight height H, heading overlapping rate P, or shooting field of view FOV corresponding to the operation performed by the movable platform in the survey area can be substituted into the formula to calculate first distance threshold D1.

For example, the predetermined distance formula is $D=2*H*\tan(FOV/2)*(1-P)$. After flight height H, heading overlapping rate P, and shooting field of view FOV of the movable platform when performing the operation in the survey area are obtained, flight height H, heading overlapping rate P, and shooting field of view FOV can be substituted into the formula to calculate first distance threshold D1.

At S10221, if the first distance between the two neighboring shooting points is greater than the first distance threshold, the area between the two neighboring shooting points is determined to be the missed area.

For the single-direction shooting sequence, after the first distance between the two neighboring shooting points is calculated according to the picture shooting information corresponding to the shooting point, the first distance can be compared to the first distance threshold D1. If the first distance between the two neighboring shooting points is greater than the first distance threshold D1, the area between the two neighboring shooting points can be determined to be the missed area.

Figure 10:
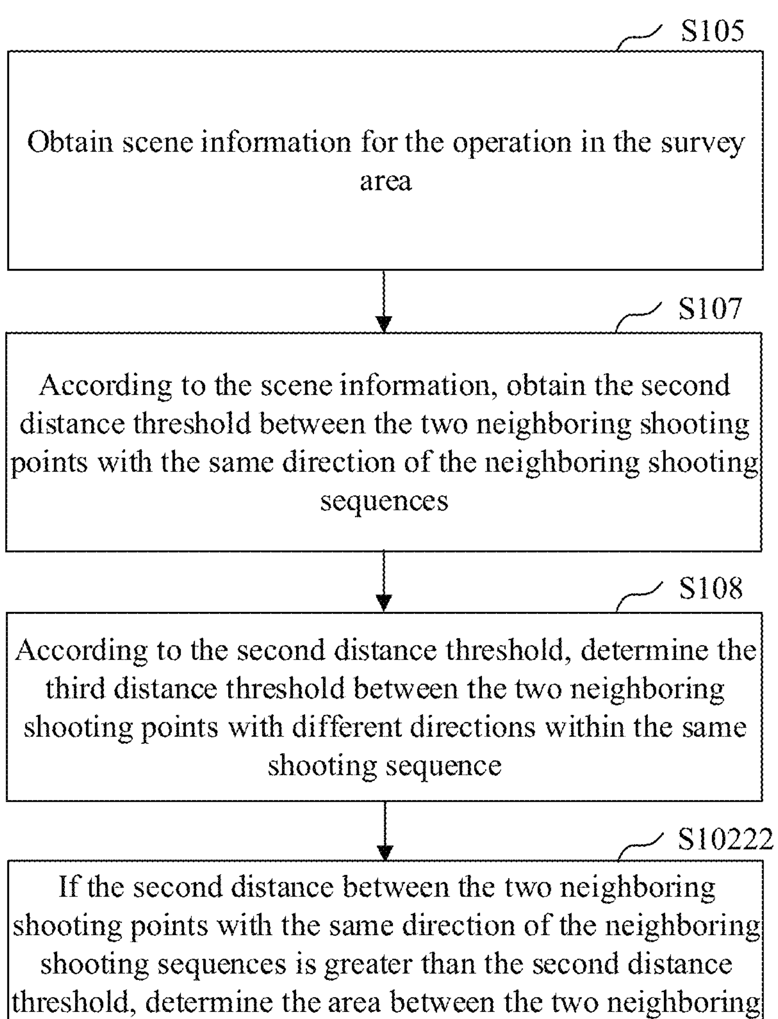
FIG. 10 is another schematic flowchart of determining a missed area consistent with an embodiment of the present disclosure.

In some embodiments, as shown in FIG. 10, process S105, process S107, and process S108. Process S1022 further includes sub-process S10222.

At S105, the scene information for the survey area operation is obtained.

Obtaining the scene information is described above, which is not repeated here.

At S107, according to the scene information, the second distance threshold between the two shooting points with the same direction in the neighboring shooting sequences is obtained.

Second distance threshold D2 can represent the theoretical distance between the two shooting points with the same direction in the neighboring shooting sequences under the multi-directional shooting operation. Second distance threshold D2 can be determined according to the scene information corresponding to the survey area operation. Second distance threshold D2 can be the same as or different from first distance threshold D1.

In some embodiments, the calculation method for second distance threshold D2 is the same as the calculation method for first distance threshold D1. Second distance threshold D2 between the two shooting points with the same direction in the neighboring shooting sequences can be calculated according to formula D=2*H*tan(FOV/2)*(1−P).

At S108, according to the second distance threshold, the third distance threshold between the two neighboring shooting points with different directions within the same shooting sequence is determined.

If the same shooting sequence of the survey area operation corresponds to N shooting directions (angles), according to second distance threshold D2 between the two shooting points with the same direction in the neighboring shooting sequences and the N shooting directions, third distance threshold d between the two neighboring shooting points with different directions within the same shooting sequence can be determined as d=D2/N.

Figure 11:
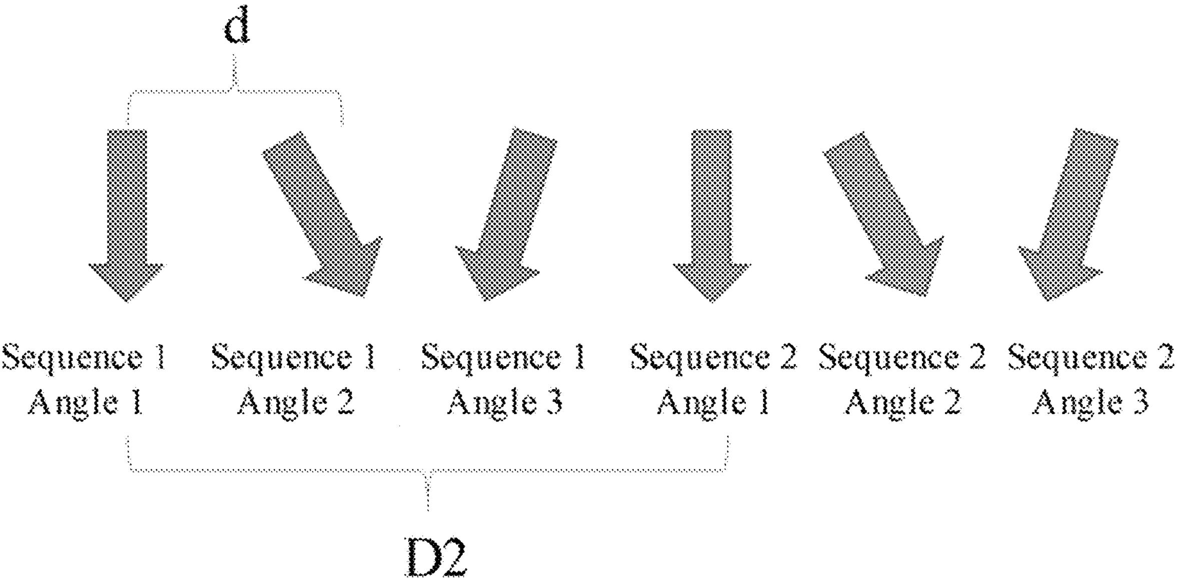
FIG. 11 is a schematic diagram showing a second distance threshold D2 and a third distance threshold d consistent with an embodiment of the present disclosure.

For example, as shown in FIG. 11, D2 represents the second distance threshold between the two neighboring shooting points with the same direction (e.g., angle 1) of the neighboring shooting sequences (e.g., sequence 1 and sequence 2). d represents the third distance threshold between the two neighboring shooting points with different directions (e.g., angle 1 and angle 2) within the same shooting sequence (e.g., sequence 1).

At S10222, if the second distance between the two points with the same direction in the neighboring shooting sequences is greater than the second distance threshold, the area between the two shooting points with the same direction in the neighboring shooting sequences is determined as the missed area, or if the third distance between the two neighboring shooting points with different directions within the same shooting sequence is greater than the third distance threshold, the area between the two neighboring shooting points with different directions within the same shooting sequence is determined to be the missed area.

For the multi-direction shooting sequence, after the second distance between the two neighboring shooting points with the same direction of the two neighboring sequences and the third distance between the two neighboring shooting points with different directions within the same shooting sequence are calculated, the second distance can be compared to second distance threshold D2, and the third distance can be compared to third distance threshold d. If the second distance between the two shooting points with the same direction in the neighboring shooting sequences is greater than second distance threshold D2, the area between the two shooting points with the same direction in the neighboring shooting sequences can be determined to be the missed area. If the third distance between the two neighboring shooting points with different directions within the same shooting sequence is greater than third distance threshold d, the area between the two neighboring shooting points with different directions within the same shooting sequence can be determined to be the missed area.

At S103, the corresponding retaking path is determined according to the at least one missed area.

Since one or more missed areas correspond to the survey area operation of the movable platform, a retaking path corresponding to the single missed area or a retaking path corresponding to the plurality of missed areas can be determined for the situation of the single missed area and the plurality of missed areas.

Figure 12:
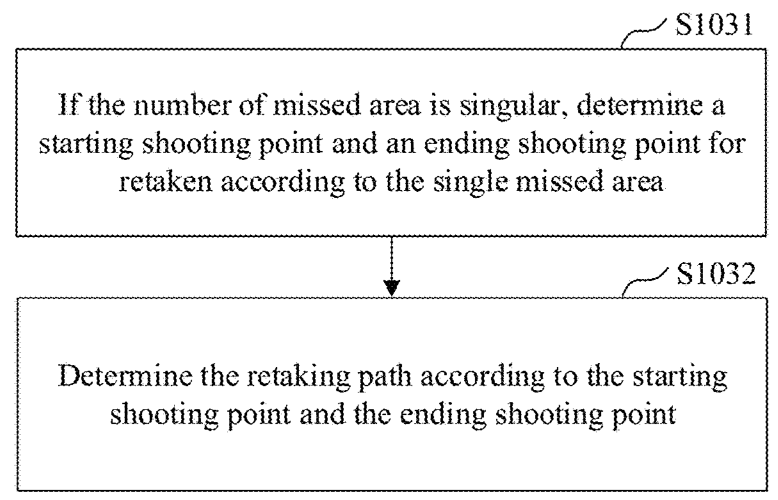
FIG. 12 is a schematic flowchart of determining a corresponding retaking path according to at least one missed area consistent with an embodiment of the present disclosure.

In some embodiments, as shown in FIG. 12, process S103 includes sub-process S1031 and sub-process S1032.

At S1031, if there is only a single missed area, a starting shooting point and an ending shooting point for retaking are determined according to the single missed area.

For example, if the missed area corresponds to the single-direction shooting sequence, according to the last shooting point before missing the shooting, a position with first distance threshold D1 after the position of the last shooting point before missing the shooting can be used as the starting shooting point for retaking. According to a first shooting point when the shooting continues, a position with first distance threshold D1 before the position of the first shooting point when the shooting continues can be used as the ending shooting point for retaking.

If the missed area corresponds to a multi-directional shooting sequence, according to the last shooting point before missing the shooting, the position with third distance threshold d after the last shooting point before missing the shooting can be used as the starting shooting point for retaking. According to the first shooting point when the shooting continues, the position with third distance threshold d before the position of the first shooting point when the shooting continues can be used as the ending shooting point for retaking.

At S1032, the retaking path is determined according to the starting shooting point and the ending shooting point.

In some embodiments, for the single-direction shooting sequence, according to the starting shooting point and the ending shooting point for retaking and first distance threshold D1 between the two neighboring shooting points, shooting points for retaking can be determined in the missed area and can include the starting shooting point and the ending shooting point. According to the shooting points for retaking, the retaking path corresponding to the missed area can be determined.

For the multi-direction capture sequence, according to the shooting sequence included in the missed area, the starting shooting point and the ending shooting point for retaking, second distance threshold D2 between the two shooting points with the same direction in the neighboring shooting sequences, and third distance threshold d between the two neighboring shooting points with different directions within the same shooting sequence, the shooting points for retaking can be determined in the missed area. The retaking path corresponding to the missed area can be determined according to the shooting points for retaking.

Figures 13, 14:
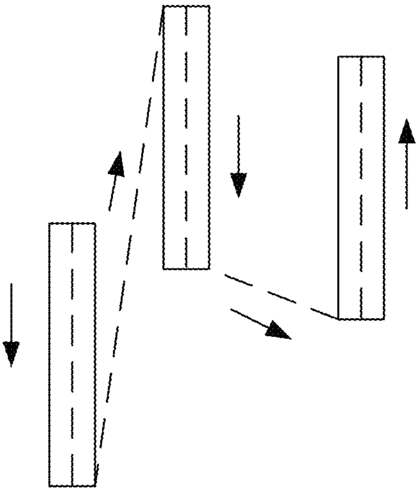
FIG. 13 is another schematic flowchart of determining a corresponding retaking path according to at least one missed area consistent with an embodiment of the present disclosure.
FIG. 14 is a schematic diagram showing an execution path corresponding to an execution sequence of a plurality of missed areas consistent with an embodiment of the present disclosure.

In some embodiments, as shown in FIG. 13, process S103 includes sub-processes S1033 and S1034.

At S1033, if a plurality of missed areas are included, an execution sequence of the plurality of missed areas is determined.

When a plurality of missed areas are included, the missed areas can have a corresponding execution sequence when retaking is performed. In some embodiments, the execution sequence of the plurality of missed areas can be determined according to an execution sequence of a shooting path of the survey area operation. The execution sequence of the plurality of missed areas can be consistent with the execution sequence of the shooting path of the survey area operation. For example, as shown in FIG. 14, according to an initially planned flight execution direction, the direction of the execution sequence for retaking the plurality of missed areas is the same as the initially planned flight execution direction. The method for determining the execution sequence of the plurality of missed areas can be simple, logically clear, and less likely to have errors. However, since the direction of the execution sequence is consistent with the initially planned flight execution direction, the retaking path may not be optimal.

Figure 15:
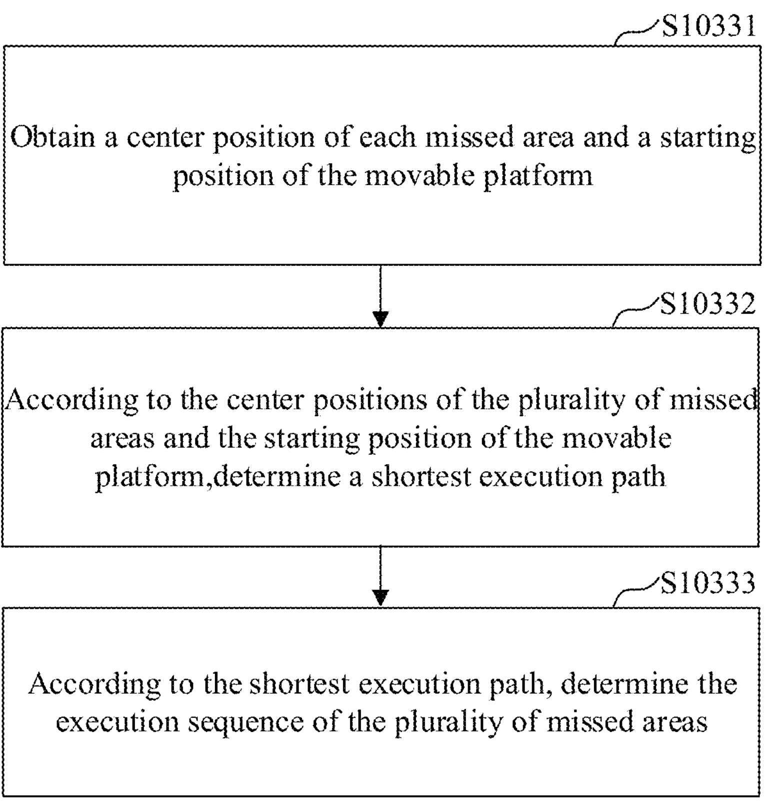
FIG. 15 is a schematic flowchart showing if a plurality of missed areas are included, determining an execution sequence of the plurality of missed areas consistent with an embodiment of the present disclosure.

In some embodiments, as shown in FIG. 15, process S1033 includes sub-processes S10331 to S10333.

At S10331, a center position of each missed area and a starting position of the movable platform are obtained.

After the missed areas are determined, the center position of each of the missed areas can be determined. Thus, the center positions of the missed areas can be obtained. the starting position of the movable platform can be obtained when performing retaking, such as the flight starting position of the movable platform.

At S10332, according to the center positions of the plurality of missed areas and the starting position of the movable platform, a shortest execution path is determined.

In some embodiments, the starting position of the movable platform can be used as a starting point. According to the center positions of the plurality of missed areas and the starting position of the movable platform, the shortest execution path traversing all the positions can be determined using a distance algorithm.

At S10333, according to the shortest execution path, the execution sequence of the plurality of missed areas is determined.

Figure 16:
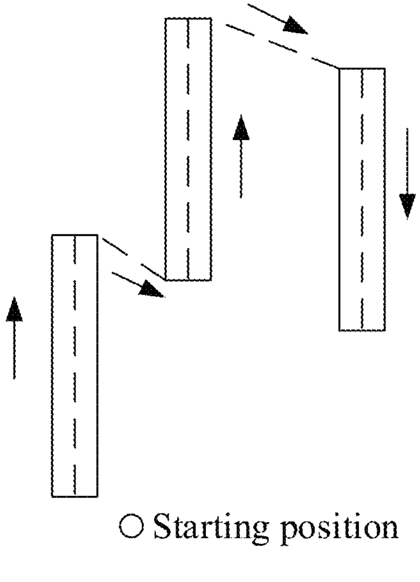
FIG. 16 is a schematic diagram of a shortest execution path consistent with an embodiment of the present disclosure.

After the shortest execution path is determined. The execution sequence of the missed areas can be determined according to the shortest execution path. For example, as shown in FIG. 16, the missed area is the same as the missed area in FIG. 14. However, the direction of the execution sequence of the missed areas determined according to the shortest execution path is opposite to the initially planned flight execution direction. The method for determining the execution sequence of the plurality of missed areas can have a short path and high execution efficiency. However, since the direction of the execution sequence of the missed areas is different from the initially planned flight execution direction, some shooting sequences may need to be performed in reverse.

In some embodiments, in addition to determining the shortest execution path based on the center positions of the missed areas, the shortest execution path can be determined according to other logic. For example, based on two endpoint positions of each missed area, an endpoint of all endpoints can be selected, which can be referred to as a first endpoint. Another endpoint corresponding to the first endpoint in the missed area can be referred to as a second endpoint. An endpoint close to the second endpoint can be determined from other endpoints except the first endpoint and the second endpoint and can be used as a third endpoint. Another endpoint corresponding to the third endpoint in the missed area can be referred to as a fourth endpoint. An endpoint closest to the fourth endpoint can be determined from other endpoints except the first endpoint, the second endpoint, the third endpoint, and the fourth endpoint and can be referred to as a fifth endpoint. Another endpoint corresponding to the fifth endpoint in the missed area can be referred to as a sixth endpoint, and so on until a last endpoint of the last missed area can be determined. According to the first endpoint, the second endpoint, the third endpoint, . . . , and a last endpoint, a corresponding execution path can be determined. With a traversing method, each endpoint can be used as the first endpoint in sequence. The corresponding execution path can be determined according to the above method. After the traversing, a plurality of execution paths can be obtained. the path lengths of the plurality of execution paths can be different.

For example, N missed areas can correspond to 2N endpoints. The 2N endpoints can be traversed in a traversing method. Assume that the first endpoint that is currently traversed is endpoint a, end point a can be used as the starting point of the current missed area. Another endpoint corresponding to endpoint a in the missed area is endpoint b. Endpoint c closest to endpoint b can be determined from 2N−2 endpoints except endpoint a and endpoint b and can be used as the starting point of the next missed area, and so on until all the endpoints are traversed to obtain 2N execution paths.

According to the path lengths of the execution paths, the shortest execution path can be determined. According to the determined shortest execution path, the execution sequence of the plurality of missed areas can be determined.

At S1034, according to the plurality of missed areas and the execution sequence of the plurality of missed areas, the retaking path can be determined.

For example, if the missed areas include missed area 1, missed area 2, and missed area 3, the corresponding execution sequence can be missed area 1 first, followed by missed area 3, and then missed area 2. Thus, the corresponding retaking path can be determined as missed area 1→missed area 3→missed area 2.

Figure 17:
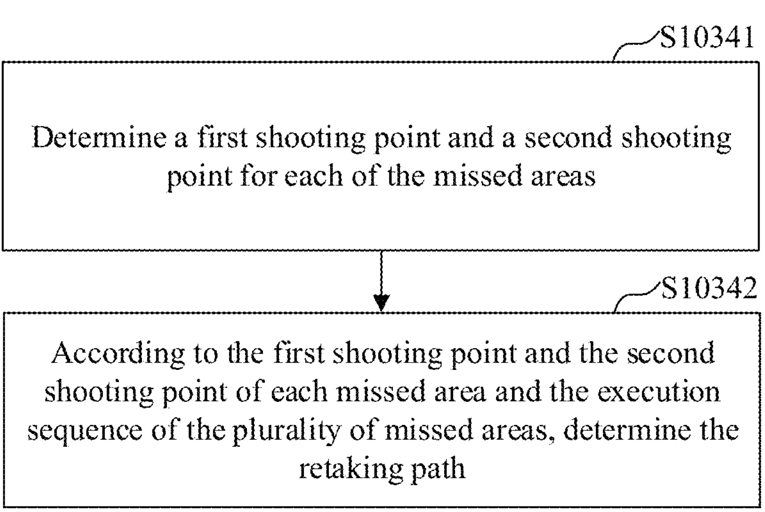
FIG. 17 is a schematic flowchart of determining a retaking path according to a plurality of missed areas and an execution sequence of the plurality of missed areas consistent with an embodiment of the present disclosure.

In some embodiments, as shown in FIG. 17, process S1034 includes sub-processes S10341 and S10342.

At S10341, a first shooting point and a second shooting point are determined for each of the missed areas.

Since each missed area includes one or more shooting sequences. If only one shooting sequence is included, the shooting sequence can be a single-direction shooting sequence or a multi-direction shooting sequence. If the plurality of shooting sequences are included, each shooting sequence of the plurality of shooting sequences can be a single-direction shooting sequence or a multi-direction shooting sequence. Thus, for each missed area, according to the shooting sequence corresponding to each shooting sequence, the first shooting point and the second shooting point of each missed area can be determined. The first shooting point can refer to a first point for retaking in the missed area. The second shooting point can refer to an endpoint for retaking in the missed area.

In some embodiments, determining the first shooting point and the second shooting point for each missed area can include determining the last shooting point before missing the shooting corresponding to each missed area and the beginning shooting point when the shooting continues, and determining the first shooting point and the second shooting point for each missed area according to the last shooting point before missing the shooting and the beginning shooting point when the shooting continues.

For example, if point A is the last shooting point before missing the shooting, and point B is the beginning shooting point when the shooting continues, the first shooting point can be determined according to point A, and the second shooting point can be determined according to point B.

In some embodiments, determining the first shooting point for each missed area can include determining a shooting sequence corresponding to the last shooting point before missing the shooting and determining the first shooting point of each missed area according to the shooting sequence corresponding to the last shooting point before missing the shooting.

Figure 18:
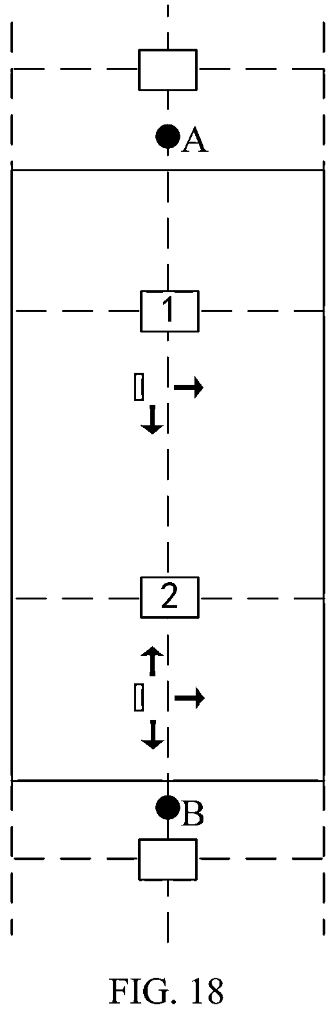
FIG. 18 is a schematic diagram showing last shooting point A before shooting is missed and first shooting point B after the missed shooting is recovered consistent with an embodiment of the present disclosure.

For example, as shown in FIG. 18, point A is the last shooting point before missing the shooting and is in a single-direction shooting sequence, and point B is the beginning shooting point after the shooting recovers and is in a four-direction shooting sequence. The first shooting point is determined according to point A in the single-direction shooting sequence, and the second shooting point is determined according to point B in the four-direction shooting sequence.

In some embodiments, determining the first shooting point for each missed area can include if the shooting sequence of the last shooting point before missing the shooting corresponds to the single-direction shooting, determining a first candidate shooting point. The distance between the first candidate shooting point and the last shooting point before missing the shooting can be a second distance threshold. The second distance threshold can be a distance threshold between two shooting points with the same direction of neighboring shooting sequences. Determining the first shooting point for each missed area can further include determining the first candidate shooting point as the first shooting point.

For example, as shown in FIG. 18, if point A is in the single-direction shooting sequence. Second distance threshold D2 is added along the flight direction to point A. The corresponding first candidate shooting point is determined, and the first candidate shooting point is determined as the first shooting point.

The first shooting point can be located between point A and separation point 1 or may not be located between point A and separation point 1. If the first shooting point is not between point A and separation point 1, point A can be the last point of the single-direction shooting sequence. The retaking can directly begin from a next area (i.e., a three-direction shooting sequence). That is, the first shooting point can be in the three-direction shooting sequence. If the first shooting point is between point A and separation point 1, the first shooting point is still in the single-direction shooting sequence.

Point B can be the beginning shooting point when the shooting recovers after missing the shooting and can be in the four-direction shooting sequence. At a position having distance D2 to point B along a direction opposite to the flight direction, the second shooting point can be determined. Similarly, if the second shooting point is not between separation point 2 and point B, the ending shooting point for retaking in the missed area can be in the three-direction shooting sequence. If the second shooting point is between separation point 2 and separation point 1, the ending shooting point for retaking in the missed area can be in the three-direction shooting sequence. If the second shooting point is between separation point 1 and the first shooting point, the ending shooting point for retaking in the missed area can be in the single-direction shooting sequence. That is, the entire missing part can be in the single-direction shooting sequence.

For example, if point A is in the multi-direction shooting sequence, third distance threshold d can be added along the flight direction from point A, a corresponding second candidate shooting point can be determined, and the second candidate shooting point can be determined as the first shooting point.

At S10342, according to the first shooting point and the second shooting point of each missed area and the execution sequence of the plurality of missed areas, the retaking path is determined.

According to the first shooting point and the second shooting point for each missed area and the shooting sequence corresponding to each missed area, missing shooting points corresponding to each missed area can be completed. According to the complete shooting points of each missed area and the execution sequence corresponding to the missed areas, the retaking path can be determined.

For example, if the missed area starts from a multi-directional shooting sequence, shooting points corresponding to N-n shooting directions (angles) within the multi-directional shooting sequence can be completed first. N can be the total number of shooting directions (angles) within the entire shooting sequence, and n can be the number of shooting points within the sequence that are not missed. After completing N-n shooting points within the multi-direction sequence, other shooting points can be added according to distance D2 between sequences and distance d between different directions within the same sequence. Thus, the shooting points corresponding to the missing shooting directions in the multi-direction sequence in the missed area can be completed.

Figure 19:
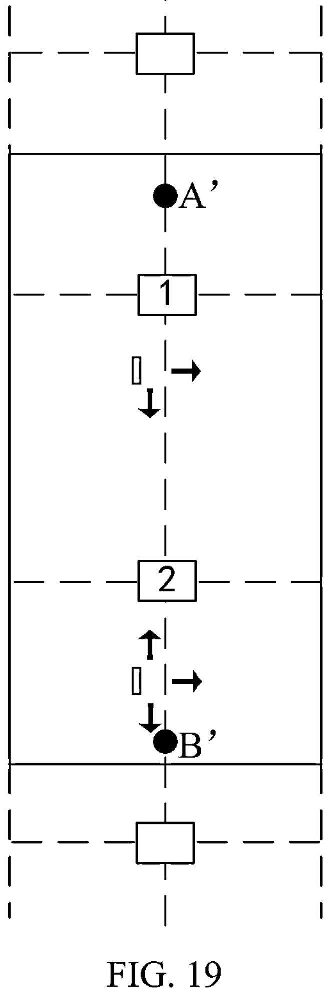
FIG. 19 is a schematic diagram of a first shooting point A' and a second shooting point B' consistent with an embodiment of the present disclosure.

For example, as shown in FIG. 19, if the first shooting point is point A', and the second shooting point is point B', shooting points are completed starting from point A' to separation point 1 with a distance D1 according to the single-direction shooting sequence. Shooting points are completed between separation point 1 and separation point 2 with distance D2 between sequences according to a three-direction shooting sequence and distance d=D2/3 between different directions within the same sequence. Shooting points are completed between separation point 2 and point B' with distance D2 between sequences according to a four-direction shooting sequence and distance d=D2/4 between different directions within the same sequence.

By automatically generating the retaking sequence and retaking path connecting with the original flight path seamlessly, the retaking path can be generated efficiently and can be reliable.

At S104, based on the retaking path, the camera apparatus is controlled to perform a picture retaking operation to obtain a picture corresponding to at least one missed area.

After obtaining the retaking path corresponding to the missed area, the camera apparatus can be controlled to perform the picture retaking operation for the shooting points according to the retaking path to obtain pictures corresponding to the missing shooting points.

Figure 20:
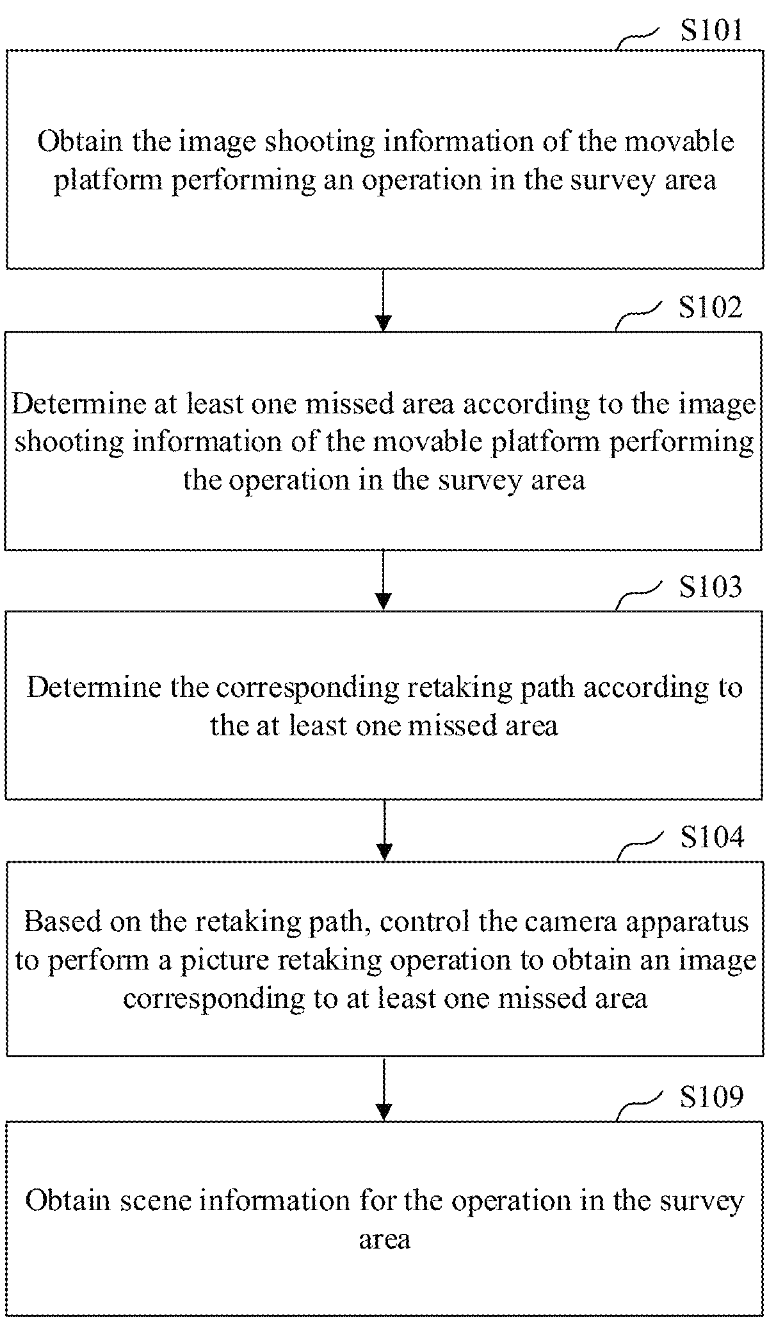
FIG. 20 is a schematic flowchart of another picture retaking method consistent with an embodiment of the present disclosure.

In some embodiments, as shown in FIG. 20, the method further includes process S109 after process S104.

At S109, the pictures obtained through the retaking operation are associated with the pictures shot during the survey area operation and saved.

To further enhance the user experience, a specific storage path can be set for the pictures obtained by the picture retaking operation. The pictures obtained through the picture retaking operation can be associated with the pictures shot during the survey area operation for storage. Thus, the retaking operation can be associated with the survey area operation performed earlier.

Figure 21:
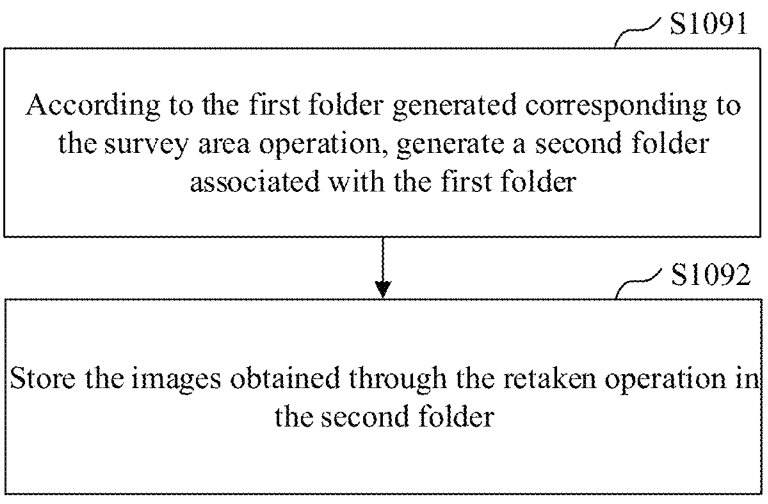
FIG. 21 is a schematic flowchart of associating and storing a picture obtained by a retaking operation with a picture shot during a survey area operation consistent with an embodiment of the present disclosure.

In some embodiments, as shown in FIG. 21, process S109 includes sub-processes S1091 and S1092.

At S1091, according to the first folder generated corresponding to the survey area operation, a second folder associated with the first folder is generated.

For example, if the first folder corresponding to the survey area operation can be yymmddhhmm_N by default or ABCDEF defined by the user. The first folder can store the pictures shot during the survey area operation. According to the folder name of the first folder, the second folder logically associated with the first folder can be generated with the name yymmddhhmm_N_sup or ABCDEF_sup.

At S1092, the pictures obtained through the retaking operation are stored in the second folder.

For example, the pictures obtained through the retaking operation can be stored within the second folder named yymmddhhmm_N_sup or ABCDEF_sup.

In some embodiments, a plurality of sub-folders that are logically associated can be generated under the second folder. The pictures obtained through the retaking operation can be dividedly stored in the sub-folders.

For example, if three segments are divided for flight path retaking, the sub-folders generated under the second folder can be named with yymmddhhmm_N_sup_n (n=1, 2, 3) or ABCDEF_sup_n (n=1, 2, 3). The pictures retaken for the segments of the flight path can be saved to the sub-folders to ensure the retaken pictures are associated with the pictures shot during the survey area operation.

In some embodiments, associating the pictures obtained through the retaking operation with the pictures shot during the survey area operation for storage can include according to the shooting points corresponding to the pictures obtained through the retaking operation, inserting the pictures obtained through the retaking operation into the saved pictures shot during the survey area operation.

Different from using the associated folder to save the pictures obtained through the retaking operation, if the user needs to sort and store all the pictures according to certain correct sequence numbers, the sequence numbers corresponding to the pictures can be determined according to the shooting points corresponding to the pictures obtained according to the retaking operation. According to the sequence of the sequence numbers, the pictures obtained through the retaking operation can be inserted into the pictures shot during the survey area operation.

It's worth noting that in addition to the two methods of associating and saving the pictures with the pictures captured during the survey area operations that were listed above, other methods of associating and saving the recaptured pictures with the original survey area pictures can also be employed. There are no specific restrictions in this regard.

Except for the two methods of associating the pictures obtained through the retaking operation with the pictures shot during the survey area operation for storage, other methods can also be used to associate the pictures obtained through the retaking operation with the pictures shot during the survey area operation for storage, which is not limited here.

By associating the pictures obtained through the retaking operation with the pictures shot during the survey area operation for storage, the retaken pictures can be associated with the pictures obtained during the survey area operation. Thus, the user can conveniently obtain all the pictures, which improves the user experience.

In the described embodiments, the picture shooting information can be obtained when the movable platform performs the survey area operation. According to the picture shooting information, at least one missed area can be determined when the movable platform performs the survey area operation. Then, according to the at least one missed area, the corresponding retaking path can be determined. Based on the retaking path, the camera apparatus can be controlled to perform the picture retaking operation to obtain the pictures corresponding to the at least one missed area. Compared to the method of manually determining the missing positions and planning the flight path for retaking, the pictures can be retaken conveniently and reliably.

Figure 22:
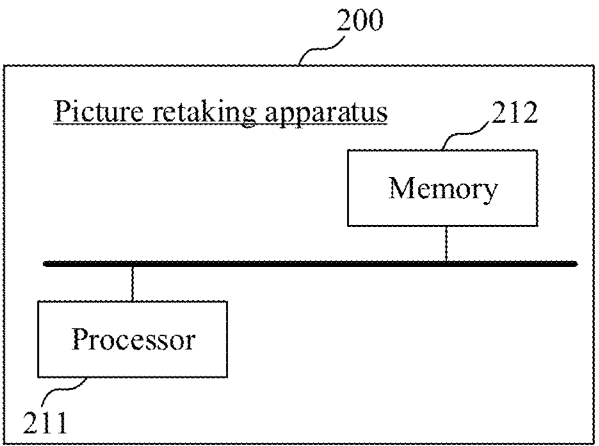
FIG. 22 is a schematic block diagram of a picture retaking apparatus consistent with an embodiment of the present disclosure.

FIG. 22 is a schematic block diagram of a picture retaking apparatus 200 consistent with an embodiment of the present disclosure.

As shown in FIG. 22, the picture retaking apparatus 200 includes a processor 211 and a memory 212. The processor 211 and memory 212 are interconnected via a bus. The bus, for example, can be an Inter-integrated Circuit (I2C) bus.

In some embodiments, the processor 211 can include a microcontroller unit (MCU), a central processing unit (CPU), or a digital signal processor (DSP), etc.

The memory 212 can include a flash memory chip, a read-only memory (ROM) disk, an optical disk, a USB drive, or a portable hard drive. The memory 212 can store various computer programs for execution by the processor 211.

The processor can be configured to execute the computer programs stored in the memory to obtain the picture shooting information when the movable platform performs the survey area operation, determine at least one missed area according to the picture shooting information when the movable platform performs the survey area operation, determine the corresponding retaking path according to the at least one missed area, and control the camera apparatus to perform the picture retaking operation based on the retaking path to obtain the pictures corresponding to the at least one missed area.

In some embodiments, the picture shooting information can include at least one of the shooting sequence number, the position, the attitude, or the location status.

In some embodiments, when determining the at least one missed area in real-time when the movable platform performs the survey area operation according to the picture shooting picture, the processor can be configured to determine the at least one missed area according to the picture shooting information corresponding to the shooting points where the shooting has been performed when the movable platform performs the survey area operation.

In some embodiments, when determining the at least one missed area when the movable platform performs the survey area operation according to the picture shooting picture, the processor can be configured to after the movable platform performs the survey area operation, determine the at least one missed area according to the picture shooting information corresponding to all the shooting points of the survey area operation.

In some embodiments, when determining the at least one missed area when the movable platform performs the survey area operation according to the picture shooting picture, the processor can be configured to calculate the distance between the two neighboring shooting points according to the picture shooting information, and if the distance between the two neighboring shooting points is greater than the distance threshold, determine the area between the two neighboring shooting points to be the missed area.

In some embodiments, when calculating the distance between the two neighboring shooting points according to the picture shooting information, the processor can be configured to if the survey area operation is single-direction shooting, calculate the first distance between the two neighboring shooting points according to the picture shooting information.

In some embodiments, before determining the area between the two neighboring shooting points to be the missed area in response to the distance between the two neighboring shooting points being greater than the distance threshold, the processor can be configured to obtain the scene information for the survey area operation and determine the first distance threshold according to the scene information. When determining the area between the two neighboring shooting points to be the missed area in response to the distance between the two neighboring shooting points being greater than the distance threshold, the processor can be configured to if the first distance between the two neighboring shooting points being greater than the first distance threshold, determine the area between the two neighboring shooting points to be the missed area.

In some embodiments, the scene information can include one or more of the flight altitude, the heading overlapping rate, or the shooting field of view.

When determining the first distance threshold according to the scene information, the processor can be configured to substitute the flight altitude, the heading overlapping rate, or the shooting field of view parameters into the predetermined distance calculation formula to calculate the first distance threshold.

In some embodiments, when calculating the distance between the two neighboring shooting points according to the picture shooting information, the processor can be configured to if the survey area operation is multi-direction shooting, calculate the second distance between the two shooting points with the same direction in the neighboring shooting sequences according to the picture shooting information and the third distance between the two neighboring shooting points with different directions within the same shooting sequence.

In some embodiments, before determining the area between the two neighboring shooting points to be the missed area in response to the distance between the two neighboring shooting points being greater than the distance threshold, the processor can be configured to obtain the scene information for the survey area operation, determine the second distance threshold between the two shooting points with the same direction of the neighboring shooting sequences according to the scene information, and determine the third distance threshold between the two neighboring shooting points with different directions within the same shooting sequence according to the second distance threshold. When determining the area between the two neighboring shooting points to be the missed area in response to the distance between the two neighboring shooting points being greater than the distance threshold, the processor can be configured to if the second distance between the two shooting points with the same direction of the neighboring shooting sequences is greater than the second distance threshold, determine the area between the two shooting points with the same direction of the neighboring shooting sequences to be the missed area, or if the third distance between the two neighboring shooting points with different directions within the same shooting sequence, determine the area between the two neighboring shooting points with different directions within the same shooting sequence to be the missed area.

In some embodiments, when determining the corresponding retaking path according to the at least one missed area, the processor can be configured to if there is only a single missed area, determine the starting shooting point and the ending shooting point for retaking according to the single missed area, and determine the retaking path according to the starting shooting point and the ending shooting point.

In some embodiments, when determining the corresponding retaking path according to the at least one missed area, the processor can be configured to if there are a plurality of missed areas, determine the execution sequence of the plurality of missed areas, and determine the retaking path according to the plurality of missed areas and the execution sequence of the plurality of missed areas.

In some embodiments, when determining the execution sequence of the plurality of missed areas, the processor can be configured to determine the execution sequence of the plurality of missed areas according to the execution sequence of the shooting path of the survey area operation.

In some embodiments, when determining the execution sequence of the plurality of missed areas, the processor can be configured to obtain the center position of each missed area and the starting position of the movable platform, determine the shortest execution path according to the center position of each missed area and the starting position of the movable platform, and determine the execution sequence of the plurality of missed areas according to the shortest execution path.

In some embodiments, determining the retaking path according to the plurality of missed areas and the execution sequence of the plurality of missed areas, the processor can be configured to determine the first shooting point and the second shooting point for each missed area, and determine the retaking path according to the first shooting point and the second shooting point for each missed area and the execution sequence of the plurality of missed areas.

In some embodiments, when determining the first shooting point and the second shooting point for each missed area, the processor can be configured to determine the last shooting point before missing the shooting corresponding to each missed area and the beginning shooting point when the shooting continues, and determine the first shooting point and the second shooting point for each missed area according to the last shooting point before missing the shooting and the beginning shooting point when the shooting continues.

In some embodiments, when determining the first shooting point of each missed area, the processor can be configured to determine the shooting sequence corresponding to the last shooting point before missing the shooting, and determine the first shooting point of each missed area according to the shooting sequence corresponding to the last shooting point before missing the shooting.

In some embodiments, determining the first shooting point of each missed area, the processor can be configured to if the shooting sequence of the last shooting point corresponds to the single-direction shooting, determine the first candidate shooting point and determine the first candidate shooting point to be the first shooting point. The distance between the first candidate shooting point and the last shooting point before missing the shooting can be the second distance threshold. The second distance threshold can be the distance threshold between two shooting points with the same direction of neighboring shooting sequences.

In some embodiments, when determining the first shooting point of each missed area, the processor can be configured to if the shooting sequence of the last shooting point before missing the shooting corresponds to the multi-direction shooting, determine the second candidate shooting point, and determine the second candidate shooting point as the first shooting point. The distance between the second candidate shooting point and the last shooting point before missing the shooting can be the third distance threshold. The third distance threshold can be the distance threshold between the two neighboring shooting points with different directions within the same shooting sequence.

In some embodiments, the processor can be configured to, after controlling the camera apparatus to perform the picture retaking operation according to the retaking path to obtain the picture corresponding to the at least one missed area, associate the picture obtained through the retaking operation with the picture shot during the survey area operation for storage.

In some embodiments, when associating the pictures obtained through the retaking operation with the pictures shot during the survey area operation for storage, the processor can be configured to generate the second folder associated with the first folder according to the first holder generated corresponding to the survey area operation and save the pictures obtained through the retaking operation into the second folder.

In some embodiments, when associating the pictures obtained through the retaking operation with the pictures shot during the survey area operation for storage, the processor can be configured to insert the pictures obtained through the retaking operation into the pictures shot during the survey area operation according to the shooting points corresponding to the pictures obtained through the retaking operation.

Embodiments of the present disclosure further provide a computer-readable storage medium. The computer-readable storage medium can store a computer program. The computer program can include program instructions. The processor can be configured to execute the program instructions to implement processes of the picture retaking method of embodiments of the present disclosure.

The computer-readable storage medium can be an internal storage unit of the movable platform or picture retaking apparatus, for example, a hard drive or memory of the movable platform or the picture retaking apparatus. The computer-readable storage medium can an external storage apparatus of the movable platform or the picture retaking apparatus, for example, a plugin hard drive, a smart media card (SMC), a secure digital (SD) card, or a flash card.

The described embodiments are some embodiments of the present disclosure. The scope of the present disclosure is not limited to this. Those skilled in the art can think of equivalent modifications or replacements within the scope of the present disclosure. These modifications and replacements are within the scope of the present disclosure. Thus, the scope of the present disclosure is subject to the scope of the claims.

What is claimed is:

1. A control system comprising:
one or more processors; and
one or more memories storing one or more computer programs that, when executed by the one or more processors, cause the one or more processors to:
obtain operation information of a movable platform performing an operation in a target area;
determine a plurality of operation abnormal areas of the movable platform performing the operation in the target area according to the operation information;
determine an execution sequence of the plurality of operation abnormal areas;
determine a supplement operation path according to the plurality of operation abnormal areas and the execution sequence of the plurality of operation abnormal areas; and
control the movable flatform to perform a supplement operation based on the supplement operation path.

2. The system of claim 1, wherein the one or more processors are further configured to perform at least one of:
when the movable platform performs the operation in the target area, determining the plurality of operation abnormal areas in real-time according to the operation information of operation points at which the operation has been performed;
after the movable platform performs the operation in the target area, determining the plurality of operation abnormal areas according to the operation information corresponding to all operation points in the target area; or
according to the operation information, calculating a distance between two neighboring operation points, and in response to the distance between the two neighboring operation points being greater than a distance threshold, determining an area between the two neighboring operation points as one of the plurality of operation abnormal areas.

3. The system of claim 2, wherein the one or more processors are further configured to, before determining the area between the two neighboring operation points as the one of the plurality of operation abnormal areas in response to the distance between the two neighboring operation points being greater than the distance threshold:
obtain scene information of the operation in the target area; and
determine the distance threshold according to the scene information.

4. The system of claim 3, wherein:
the scene information includes at least one of a flight height, a heading overlapping rate, or a shooting field of view; and
the one or more processors are further configured to:
calculate the distance threshold according to at least one of the flight height, the heading overlapping rate, or the shooting field of view.

5. The system of claim 2, wherein the one or more processors are configured to perform at least one of:
in response to the operation in the target area being single direction shooting, the distance including a first distance between the two neighboring shooting points, and the distance threshold including a first distance threshold, determining an area between the two neighboring shooting points to be a missed area in response to the first distance being greater than the first distance threshold;
in response to the operation in the target area being multi-direction shooting, the distance including a second distance between two shooting points, of neighboring shooting sequences, in a same direction, and the distance threshold including a second distance threshold corresponding to the second distance, determining an area between the two shooting points, of the neighboring shooting sequences, in the same direction as a missed area in response to the second distance being greater than the second distance threshold; or
in response to the operation in the target area being the multi-direction shooting, the distance including a third distance between two neighboring shooting points of a same shooting sequence in different directions, and the distance threshold including a third distance threshold corresponding to the third distance, determining an area between the two neighboring shooting points of the same shooting sequence in the different directions as a missed area in response to the third distance being greater than the third distance threshold.

6. The system of claim 1, wherein the one or more processors are further configured to perform at least one of:

determining the execution sequence of the plurality of operation abnormal areas according to an execution sequence of the operation path of the operation in the target area, the execution sequence of the plurality of operation abnormal areas being consistent with an execution sequence of a shooting path of the operation in the target area; or obtaining a center position of each of the plurality of operation abnormal areas and a starting position of the movable platform, determining a shortest execution path according to center positions of the plurality of operation abnormal areas and the starting position of the movable platform, and determining the execution sequence of the plurality of operation abnormal areas according to the shortest execution path.

7. The system of claim 1, wherein the one or more processors are further configured to:

determine at least one operation point of each of the plurality of operation abnormal areas; and according to the at least one operation point of each of the plurality of operation abnormal areas and the execution sequence of the plurality of operation abnormal areas, determine the supplement operation path.

8. The system of claim 7, wherein the one or more processors are further configured to:

determine a last operation point before the operation being abnormal corresponding to each of the plurality of operation abnormal areas and a first operation point when the operation continues; and determine a first operation point and a second operation point of each of the plurality of operation abnormal areas according to the last operation point before the operation being abnormal and the first operation point when the operation continues; and determine the supplement operation path according to the first operation point and the second operation point of each of the plurality of operation abnormal areas and the execution sequence of the plurality of operation abnormal areas.

9. The system of claim 1, wherein:

the operation includes picture shooting; and/or the operation information includes picture shooting information; and/or the picture shooting information includes at least one of a shooting sequence number, a position, an attitude, or a positioning status; and/or the operation abnormal area includes a missed area in which shooting is missed; and/or the movable platform includes an aircraft; and/or the movable platform carries a camera apparatus.

10. A control method comprising:

obtaining operation information of a movable platform performing an operation in a target area;

determining a plurality of operation abnormal areas of the movable platform performing the operation in the target area according to the operation information;

determining an execution sequence of the plurality of operation abnormal areas;

determining a supplement operation path according to the plurality of operation abnormal areas and the execution sequence of the plurality of operation abnormal areas; and controlling the movable platform to perform a supplement operation based on the supplement operation path.

11. The method of claim 10, wherein determining the plurality of operation abnormal areas when the movable platform operates in the target area according to the operation information includes at least one of:

when the movable platform performs the operation in the target area, determining the plurality of operation abnormal areas in real-time according to the operation information of operation points at which the operation has been performed;

after the movable platform performs the operation in the target area, determining the plurality of operation abnormal areas according to the operation information corresponding to all operation points in the target area; or according to the operation information, calculating a distance between two neighboring operation points, and in response to the distance between the two neighboring operation points being greater than a distance threshold, determining an area between the two neighboring operation points as one of the plurality of operation abnormal areas.

12. The method of claim 11, further comprising, before determining the area between the two neighboring operation points as the one of the plurality of operation abnormal areas in response to the distance between two neighboring operation points being greater than the distance threshold:

obtaining scene information of the operation in the target area operation; and determining the distance threshold according to the scene information.

13. The method of claim 12, wherein:

the scene information includes at least one of a flight height, a heading overlapping rate, or a shooting field of view; and determining the distance threshold according to the scene information includes:

calculating the distance threshold according to at least one of the flight height, the heading overlapping rate, or the shooting field of view.

14. The method of claim 11, further comprising at least one of:

in response to the operation in the target area being a single direction shooting, the distance including a first distance between the two neighboring shooting points, and the distance threshold including a first distance threshold, determining an area between the two neighboring shooting points to be a missed area in response to the first distance being greater than the first distance threshold;

in response to the operation in the target area being a multi-direction shooting, the distance including a second distance between two shooting points, of neighboring shooting sequences, in a same direction, and the distance threshold including a second distance threshold corresponding to the second distance, determining an area between the two shooting points, of the neighboring shooting sequences, in the same direction as a missed area in response to the second distance being greater than the second distance threshold; or in response to the operation in the target area being the multi-direction shooting, the distance including a third distance between two neighboring shooting points of a same shooting sequence in different directions, and the distance threshold including a third distance threshold corresponding to the third distance, determining an area between the two neighboring shooting points of the same shooting sequence in the different directions as a missed area in response to the third distance being greater than the third distance threshold.

15. The method of claim 10, wherein determining the execution sequence of the plurality of operation abnormal areas includes at least one of:

determining the execution sequence of the plurality of operation abnormal areas according to an execution sequence of the operation path of the operation in the target area, the execution sequence of the plurality of operation abnormal areas being consistent with an execution sequence of a shooting path of the operation in the target area; or obtaining a center position of each of the plurality of operation abnormal areas and a starting position of the movable platform, determining a shortest execution path according to center positions of the plurality of operation abnormal areas and the starting position of the movable platform, and determining the execution sequence of the plurality of operation abnormal areas according to the shortest execution path.

16. The method of claim 10, wherein determining the supplement operation path according to the plurality of operation abnormal areas and the execution sequence of the plurality of operation abnormal areas includes:

determining a first operation point and a second operation point for each operation abnormal area; and determining the supplement operation path according to the first operation point and the second operation point of each of the operation abnormal areas and the execution sequence of the plurality of operation abnormal areas.

17. The method of claim 10, wherein:

the operation includes picture shooting; and/or the operation information includes picture shooting information; and/or the picture shooting information includes at least one of a shooting sequence number, a position, an attitude, or a positioning status; and/or the operation abnormal area includes a missed area in which shooting is missed; and/or the movable platform includes an aircraft; and/or the movable platform carries a camera apparatus.

18. A control system comprising:

one or more processors; and one or more memories storing one or more computer programs that, when executed by the one or more processors, cause the one or more processors to:

obtain operation information of a movable platform performing an operation in a target area;

determine at least one operation abnormal area of the movable platform performing the operation in the target area according to the operation information, including:

according to the operation information, calculating a distance between two neighboring operation points;

obtaining scene information of the operation in the target area;

determining a distance threshold according to the scene information; and in response to the distance between the two neighboring operation points being greater than the distance threshold, determining an area between the two neighboring operation points as one of the at least one operation abnormal area;

determine a corresponding supplement operation path according to the at least one operation abnormal area; and control the movable flatform to perform a supplement operation based on the supplement operation path.

* * * * *